Aug. 1, 1950     F. B. BRISTOL     2,516,952
INSULATED THERMOCOUPLE WITH METALLIC COATING
Filed July 12, 1945
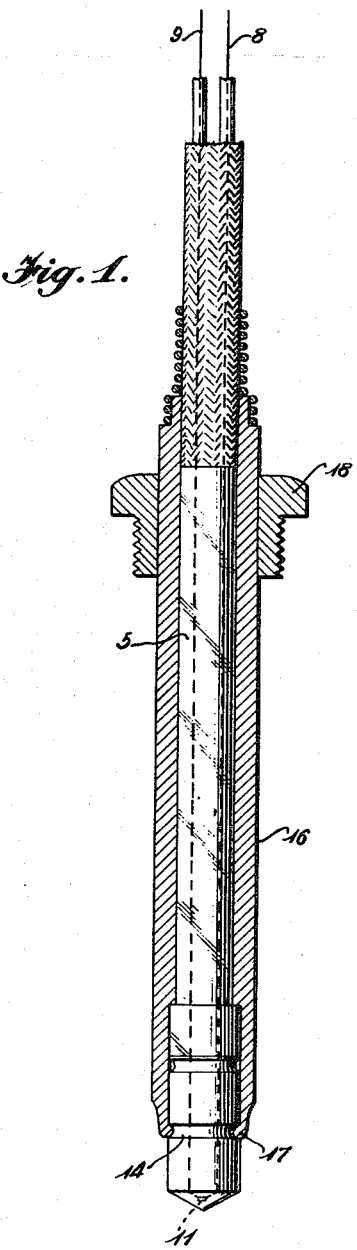
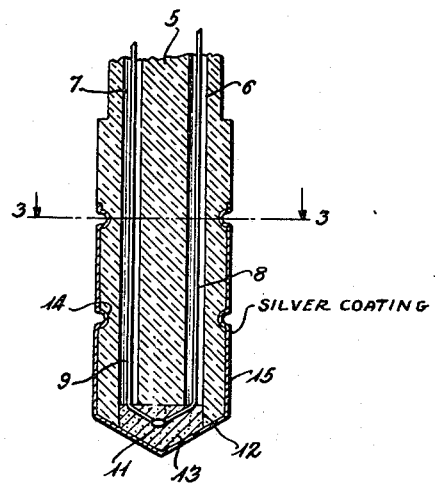
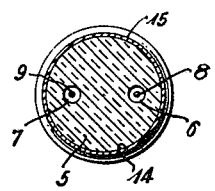
Inventor
Franklin B. Bristol
By George Lynn De Nott
Attorney Patented Aug. 1, 1950

2,516,952

UNITED STATES PATENT OFFICE 2,516,952

INSULATED THERMOCOUPLE WITH METALLIC COATING

Franklin B. Bristol, Middlebury, Conn., assignor to The Bristol Company, Waterbury, Conn., a corporation of Connecticut Application July 12, 1945, Serial No. 604,715

5 Claims. (Cl. 136—4)

This invention relates to thermocouples of the type used in the measurement and control of temperature. More particularly, it relates to a thermocouple of the type which is employed in the cylinder head or wall of internal combustion engines, under conditions requiring it to be electrically insulated from such head or wall.

Inasmuch as the temperature of an internal combustion engine is subject to rapid and extreme variations, it is necessary in obtaining continuous records of such variations, or to carrying out controls, which are functions of such variations, that the thermocouple shall not only possess a minimum mass so as to have very slight thermal inertia, but also that the couple or junction be, as closely as possible, in thermal association with the metal the temperature of which is to be sensed.

Prior art methods of providing minimum thermal inertia by welding, peening, or otherwise incorporating the sensitive junction in the mass of metal is only practicable where the placing of the couple in direct electrical contact with the mass is permissible. Consequently, where it is necessary that the couple be electrically insulated from the mass the temperature of which is to be sensed, special precautions are necessary to the attainment of satisfactory results. Even in installations where a ground was frequently tolerated even though not desirable, improvement would be advantageous.

The problem of electrically insulating thermocouples from a grounded mass of metal is particularly acute in mobile installations, especially in aircraft, where the source of electrical current supply is normally grounded to the metal structure or body of the engine. Here peculiar complications arise, especially when the power for operating self-balancing or controlling instruments requiring servo-motors is derived from the same source of power that supplies the servomotor. Such installations present the difficult problem of requiring the mutually incompatible characteristics of low electrical conductivity and high thermal conductivity of the couple sheath.

The object of the present invention is to provide a thermocouple fashioned to facilitate heat transfer between a solid mass, the temperature of which is to be measured, and the sensitive junction of the couple while electrically insulating the junction from the said mass; to provide a thermocouple having a minimum mass and a minimum thermal inertia; to provide a thermocouple having adequate mechanical strength; to provide a thermocouple which is readily removable and replaceable without permanent change in the heat transfer characteristic between the mass whose temperature is to be sensed and the sensitive part of the couple; and to provide an arrangement which is readily adaptable to both single and multiple couple arrangements regardless of whether the couples are insulated from each other or not.

Other objects and advantages will appear from the following description and the accompanying drawings in which:

Figure 1 is a partial section through a thermocouple structure embodying the present invention;

Figure 2 is an enlarged sectional detail showing the improvement of the present invention; and Figure 3 is a section on line 3—3 of Figure 2.

Referring to the drawings, reference character 5 designates a so-called ceramic bead containing parallel longitudinal passages 6 and 7 adapted to receive the thermocouple wires 8 and 9 of dissimilar metals leading to the junction 11. While the wires 8 and 9 may be any two dissimilar metals capable of functioning as a thermocouple when united, they may be composed of iron and constantan, respectively, joined at 11 where they are electrically welded together. The bead 5 is counterbored at 12 to provide an annular recess which houses the junction 11 and receives a filling of cement 13 in which the junction 11 is embedded. The cement 13 is of a material possessing high heat conductivity and low electrical conductivity. It is pressed in place, when in plastic condition, so as to contact the junction 11 intimately and to completely fill the recess 12 as indicated in Figure 2 of the drawings. Assembly of the junction in this manner insures complete intimate thermal contact between the junction and the cement and leaves no heat insulating dead air spaces. The cement 13 is then baked, and is shaped to the conical configuration which appears in Figures 1 and 2.

The cement 13 is an important element of the combination because it must serve as a heat flow path between the junction and the heat source, while electrically isolating the junction. It must be compact and homogeneous to avoid the presence of any voids which would impart heat insulating characteristics to the mass.

The characteristics desirable in the cement are analogous to those required in the insulating coatings of resistance elements where heat dissipation must be facilitated without interfering with electrical insulating properties. Consequently, any good resistor cement capable of being closely compacted may be used. Examples of materials which may be used are Portland cement, mixtures of Portland cement and sand, porcelain, fire-clay, Alundum cement, or fused aluminum oxide crushed and mixed with clay or other suitable bond, asbestos, or asbestos compounded with a suitable binder. Still another example is a mixture of boric acid, clay and a refractory material such as Alundum fines in the following proportions:

| | Per cent |
|---|---|
| Refractory material | 83 |
| Clay | 12 |
| Boric acid | 3 |

One commercially available cement which has been found to be well suited for the purposes of the invention is a cement identified as "Sauereisen Electric Resistor Cement No. 78." This material can be mixed in a plastic state, well compacted, and when baked has good heat conductivity and good electrical insulating properties.

Obviously, the present invention is not limited to the use of this or any other particular cement, provided the properties enumerated above are present.

Subsequently the bead which contains the grooves 14 and the cemented end is silverplated at 15 by any conventional method, such as electroplating, spraying, or painting. The process employed must be such as to insure close and intimate contact between the silverplating and the ceramic material beneath it. The plating is carried up to a length of ⅜ to ½ inch in the finished couple, and preferably above the top groove 14 as it appears in Figure 2. This anchors the plating firmly in position and discourages loosening of the metal layer by shocks and the like. Inasmuch as the various plating methods suggested above are known, the details need not be explained other than to indicate that the depth of the plating is preferably from 7 to 10 thousandths of an inch.

After the plating 15 is completed, the ceramic bead 5 is inserted in a stainless steel tube 16 and the tubing spun at 17 in the lower groove 14 of the bead to insure a permanent locking contact between the thermocouple and the tube. The tube 16 carries the usual fitting 18 for securing it in position.

Inasmuch as the silverplating has a high heat conductivity and the thermocouple junction is centered directly beneath the silvered tip with only a few thousandths of an inch clearance between it and the mass with which it contacts, there is a high rate of heat transfer between the mass being sensed and the couple. Since the junction 11 is embedded directly and in intimate contact with the high temperature cement 13, the thermal inertia of the couple is held at a minimum and the rate of heat transfer is very high. On the contrary the characteristics of the cement 13 result in electrically insulating the junction from the mass with which the plating 15 contacts in measurement while insuring a rapid rate of heat transfer and a prompt response by any instrument connected to wires 8 and 9, to changing conditions at the junction.

This couple is capable of functioning consistently for long periods of time and even when subject to severe usage. It is capable of functioning satisfactorily and without damage at temperatures as high as 700° F.

While a single junction is illustrated as embedded in the cement, it will be obvious that various known arrangements may be adopted. The structure is well adapted for use with different couple arrangements, since the cement may be compacted closely around the junction regardless of its size or configuration, whether it is insulated or not, and without regard to the number of junctions which are included. Consequently, while a junction of but two wires is illustrated, the word "junction" as used herein is intended to embrace any structure in which wires of different metals are joined to provide a flow of current by the Seebeck effect for measuring purposes.

Having thus described my invention, what I claim is:

1. A thermocouple structure comprising a highly compacted mass of cement substantially free from voids and having the properties of high thermal conductivity and high electrical resistance, a ceramic support for said mass arranged to leave a portion of said mass exposed, a coating of elemental metal on the exposed portion of said mass and in intimate thermal contact therewith, a thermal junction embedded in said mass, and circuit wires passing through said support and connected to said junction.

2. A thermocouple structure comprising a ceramic bead having conduit means therethrough terminating in a recess at one end, a pair of thermocouple leads of dissimilar metals passing through said conduit means and intimately united in said recess to form a thermal junction, a mass of hardened insulation having good thermal conductivity filling said recess and embedding said junction, and a metal coating on the exposed surface of said insulation and extending a substantial distance over said ceramic tube.

3. A thermocouple structure comprising an elongated ceramic element having conduit means therethrough terminating in a recess at one end, a thermal junction disposed in said recess with the leads to it passing through said conduit means, said junction being embedded in cement having high insulating value and good thermal conductivity, and a coating of silver on said cement in intimate heat conducting relation therewith and extending an appreciable distance over the outside of said ceramic elements adjacent the end containing said recess.

4. A thermocouple structure comprising an elongated ceramic element having conduit means therethrough terminating in a recess at one end, and provided with an external circumferential groove, a thermal junction disposed in said recess with the leads to it passing through said conduit means, said junction being imbedded in a firmly compacted mass of cement having high electrical insulating value and good thermal conductivity, and a coating of metal integral with a part of the outer surface of said element and of said cement mass in intimate heat-conducting relation therewith and entering said groove.

5. A thermocouple structure comprising an elongated ceramic element having conduit means therein, a recess in one end, and circumferential groove means on the outside adjacent said recess, a thermal junction in said recess and having its leads passing through said conduit means, a firmly compacted mass of cement in said recess embedding said junction with substantial absence of voids, said cement having high electrical insulating value and high thermal conductivity, a thin coating of metal intimately secured to the outer surface of said cement mass and extending over the outside of said ceramic element and into said groove means, and a tubular metal element intimately embracing said ceramic element and having its free end rolled into said groove means leaving the metal coated cement mass exposed.

FRANKLIN B. BRISTOL.

REFERENCES CITED

The following references are of record in the file of this patent:

UNITED STATES PATENTS

| Number | Name | Date |
| --- | --- | --- |
| 2,223,408 | Dietert | Dec. 3, 1940 |
| 2,405,075 | Vollrath | July 30, 1946 |

FOREIGN PATENTS

| Number | Country | Date |
| --- | --- | --- |
| 5,868/99 | Great Britain | Apr. 29, 1899 |
| 190,657 | Great Britain | Dec. 28, 1922 |

OTHER REFERENCES

Boyer et al.: J. Ind. & Eng. Chem., July 1926, page 729.

Grown: Catalog No. 14 (1924) page 49.

Schofield, F. H.: J. Iron and Steel Inst., vol. 145 (1942), pages 224P, 225P.